United States Patent [19]

Bustin

[11] 4,073,036
[45] Feb. 14, 1978

[54] MULTI-WAY GRAB RAIL

[76] Inventor: Leopold Bustin, Emmans Road, Flanders, N.J. 07836

[21] Appl. No.: 760,363

[22] Filed: Jan. 19, 1977

[51] Int. Cl.² .............................................. B60N 3/02
[52] U.S. Cl. .................................. 16/110 R; 280/727; 280/756; 296/71
[58] Field of Search ............ 16/110 R, 114 R, 111 R, 16/113, 125; 74/551.9, 552; 280/756, 727; 296/71

[56] References Cited

U.S. PATENT DOCUMENTS

| 3,523,322 | 8/1970 | Rossow | 16/111 R |
| 3,676,895 | 7/1972 | Stewart | 16/110 R |
| 3,714,844 | 2/1973 | Tsuda | 74/552 |
| 4,023,827 | 5/1977 | Matalonis et al. | 280/756 |

Primary Examiner—Louis K. Rimrodt
Attorney, Agent, or Firm—Carella, Bain, Gilfillan & Rhodes

[57] ABSTRACT

A multi-way grab handle, particularly useful for vehicles such as trucks, is disclosed to comprise a base structure and a plurality of handhold structures. The device may be oriented to provide a pair of horizontally disposed handholds and a pair of vertically disposed handholds.

5 Claims, 3 Drawing Figures

MULTI-WAY GRAB RAIL

BACKGROUND OF THE INVENTION

This invention relates to safety structures. More particularly this invention relates to multi-way grab handles for use to facilitate climbing, e.g. use to facilitate truck cab entry.

For as long as man has contemplated the problem of scaling heights he has strived to define a structure for use as handholds. The purposes to be achieved by such handhold structures are relatively uncomplicated and, as such, the structures heretofore known for achieving this function have been relatively simple. Ordinarily such structures have comprised a U-shaped bar mounted such that the grab bar is oriented horizontally or vertically as desired.

Those having ordinary skill in these arts, and in particular those who have been users of known handhold structures will quickly recognize one specific problem which has attended their use. More specifically they are unstable for purposes of supporting a climber who may otherwise have lost balance. Typically, a truck driver who is ascending the cab of a vehicle may lose footing. In such a case he ordinarily will tend to pivot around the handhold and may experience injury. The pivoting results from the fact that in conventional handholds there is no structure for user to establish a turning moment to preclude pendulous swinging if footing is lost and no adjacent handhold is available.

SUMMARY OF THE INVENTION

It is an object of the present invention, therefore, to provide a novel handhold structure, particularly for use with vehicles, which structure provides both vertically and horizontally oriented grab bars.

It is also an object of the present invention to provide a novel handhold structure wherein one or two hands of a user are accommodated.

A still further object of the present invention is to provide a novel handhold structure which may be mounted on any suitable surface and which provides both horizontal and vertical grab bars for the user.

These objects and others not enumerated are achieved by the multi-way grab handle of the present invention, one embodiment of which a base plate, a first grab handle element extending normal to the plane of the baseplate and being rigidly secured thereto adjacent to its upper end, a second grab handle element extending normal to the plane of the baseplate and being rigidly secured thereto adjacent to its lower end and third and fourth grab handle elements comprising spaced parallel bars extending between and rigidly secured to said first and second grab handle elements.

BRIEF DESCRIPTION OF THE DRAWINGS

A more complete understanding of the present invention may be had from the following detailed description thereof, particularly when read in the light of the accompanying drawings, wherein.

DETAILED DESCRIPTION

As noted above, this invention relates to grab handles. More specifically, this invention relates to multi-way grab handles, particularly to the type which are useful with vehicles.

Figure 1:
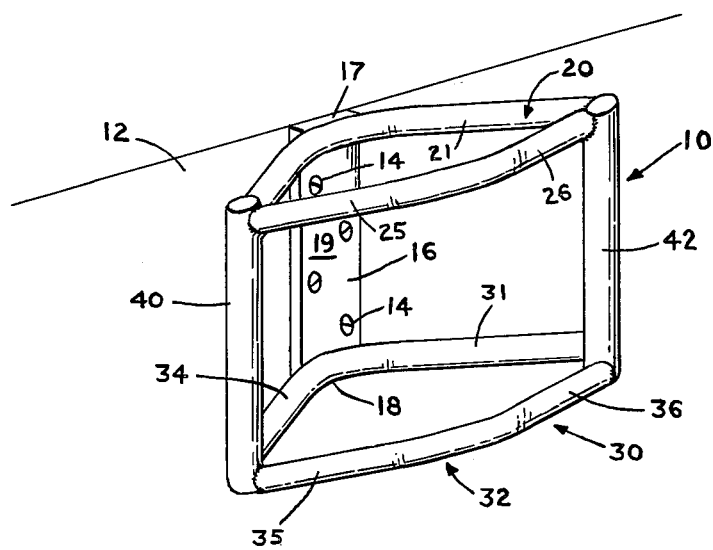
FIG. 1 is an elevational perspective view of a multi-way grab handle according to the invention.
Figure 2:
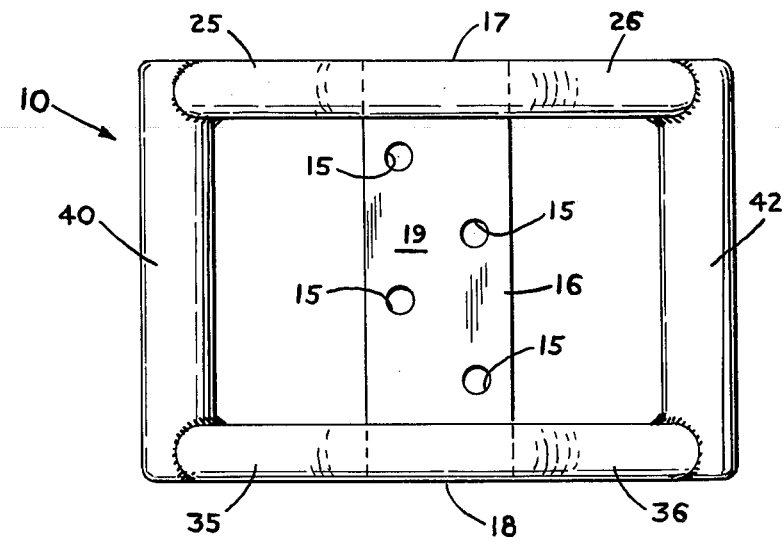
FIG. 2 is a front elevational view of a multi-way grab handle structured in accordance with the invention.
Figure 3:
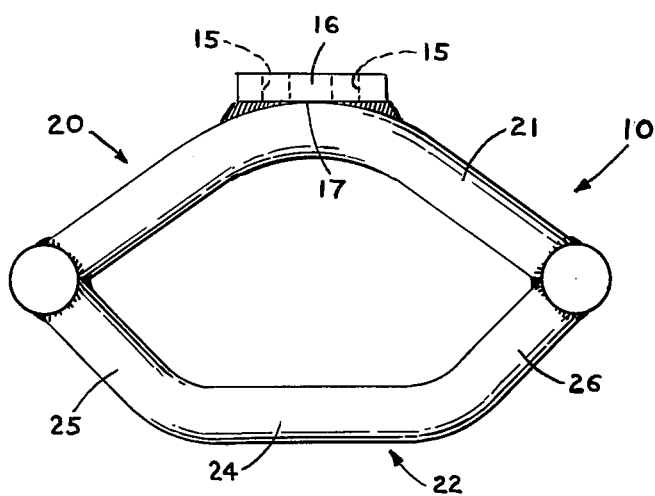
FIG. 3 is a plan view of a multi-way grab handle structured in accordance with the invention.

Considering therefore FIGS. 1 through 3, a multi-way grab handle according to the present invention is shown and designated generally by the reference numeral 10. Handle 10 is shown in FIG. 1 mounted on a support 12, e.g. the frame or wall of the cab of a truck.

Multi-way grab handle 10 is secured to support 12 by a plurality of bolts 14 extending through suitable openings 15 formed in a base plate 16. Base plate 16 is a bar structure having an upper end 17, a lower end 18 and a front surface 19. In the embodiment shown the front surface 19 of base plate 16 defines a flat plane. It is also contemplated, however, that base plate 16 may be curved suitably to accommodate the mounting of the grab handle 10 on non-flat surfaces.

The handhold structure of grab handle 10 can be seen to comprise a first or upper grab handle element 20 and a second or lower grab handle element 30. First and second grab handle elements 20, 30 are substantially identical in shape and may be formed by suitably bending bars and securing as appropriate such as by welding. The shape of first and second grab handle elements 20, 30 best may be seen with reference to FIG. 3 which shows a full plan view of upper grab handle element 20.

More specifically grab handle element 20 comprises a support section 21 and a handhold section 22. Support section 21 defines an open "V" and is secured at its central outside surface to the upper end 17 of the base plate 16. Handhold section 22 includes a central section 24 and end sections 25 and 26. The juncture of end sections 25 and 26 respectively with support section 21 defines acute angles and the positions at which are secured to upper grab handle element 20 a pair of handhold elements 40, 42 as is discussed below in detail.

As best may be seen in FIG. 1, second or lower grab handle element 30 comprises a support section 31 and a handhold section 32. Support section 31 defines an open "V" and is secured at its central outside surface to the lower end 18 of base plate 16. Handhold section 32 includes a central section 34 and end sections 35 and 36. The juncture of end sections 35 and 36 respectively with support section 31 defines a pair of acute angles.

Rigidly secured to both upper grab handle element 20 and lower grab handle element 30 such as by welding are third and fourth grab handle elements 40, 42 respectively. Third grab handle element 40 is secured at its upper end to the joint defined by the juncture of end section 25 and support section 21 of upper grab handle element 20, and at its lower end to the joint defined by the juncture of end section 35 and support section 31 of lower grab handle element 30.

Similarly, fourth grab handle element 40 is secured at its upper end to the joint defined by the juncture of end section 26 and support section 21 of upper grab handle element 20, and at its lower end to the joint defined by the juncture of end section 36 and support section 31 of lower grab handle element 30.

As noted above, upper and lower grab handle elements 20 and 30 are identical. Accordingly, in the embodiment shown, third and fourth grab handle elements 40, 42 define spaced parallel bars.

It can be seen, therefore, that the multi-way grab handle of the invention defines a handle incorporating a pair of handholds which may be horizontally oriented and a pair of handholds which may be vertically oriented which cooperate to define a clean and neatly appearing structure.

The multi-way grab handle of the invention may be manufactured from commercially available materials such as steel or aluminum. Further the multi-way grab handle according to the invention may be manufactured using known manufacturing techniques.

It will be recognized by those skilled in these arts that many modifications and variations may be made to the structure of the disclosed preferred embodiment without departing from the spirit and scope of the invention.

What is claimed is:

1. A multi-grab handle comprising:
   a. a base plate, said base plate having an upper end, a lower end and a front surface;
   b. a first grab handle element extending generally normally to said surface of said base plate, said first grab handle element being rigidly secured to said upper end of said base plate;
   c. a second grab handle element extending generally normally to said surface of said base plate, said second grab handle element being rigidly secured to said lower end of said base plate; and
   d. third and fourth grab handle elements, said third and fourth grab hand elements comprising spaced generally parallel bars extending between and rigidly secured to said first and second grab handle elements.

2. A multi-way grab handle element according to claim 1 wherein each of said first and second grab handle elements comprise a support section and a handhold section, said support section being rigidly secured to said base plate and said handhold section being rigidly secured at its ends to said support bar.

3. A multi-way grab handle according to claim 2 wherein said third and fourth grab handle elements are rigidly secured to said first and said second grab handle elements at the junctions of said handhold sections and said support sections of said first and second grab handle elements.

4. A multi-way grab handle element according to claim 2 wherein each of the support sections of said first and second grab handle elements defines an open "V".

5. A multi-way grab handle element according to claim 4 wherein said first grab handle element is secured to the upper end of said base plate at the centrally disposed outer surface of its associated support section, and said second grab handle element is secured to the lower end of said base plate at the centrally disposed outer surface of its associated support section.

* * * * *